US012352264B2

(12) United States Patent
Tubb et al.

(10) Patent No.: US 12,352,264 B2
(45) Date of Patent: Jul. 8, 2025

(54) AIR COMPRESSOR CYLINDER LINER

(71) Applicant: Orbital Australia Pty Ltd, Balcatta (AU)

(72) Inventors: John Howard Tubb, Bedfordale (AU); Gavin Warran Dickson, Kallaroo (AU); Mario Charles Muscat, Ballajura (AU)

(73) Assignee: ORBITAL AUSTRALIA PTY LTD, Balcatta (AU)

( * ) Notice: Subject to any disclaimer, the term of this patent is extended or adjusted under 35 U.S.C. 154(b) by 0 days.

(21) Appl. No.: 18/567,489

(22) PCT Filed: Jun. 29, 2022

(86) PCT No.: PCT/AU2022/050671
§ 371 (c)(1),
(2) Date: Dec. 6, 2023

(87) PCT Pub. No.: WO2023/272351
PCT Pub. Date: Jan. 5, 2023

(65) Prior Publication Data

US 2024/0271616 A1 Aug. 15, 2024

(30) Foreign Application Priority Data

Jun. 30, 2021 (AU) ................................ 2021901987

(51) Int. Cl.
*F02B 33/20* (2006.01)
*F01M 13/02* (2006.01)
(Continued)

(52) U.S. Cl.
CPC ......... *F04B 53/166* (2013.01); *F01M 13/028* (2013.01); *F02M 69/08* (2013.01); *F04B 39/126* (2013.01)

(58) Field of Classification Search
CPC ................. F04B 53/168; F04B 39/126; F01M 2001/083; F01M 13/028; F02M 69/08
See application file for complete search history.

(56) References Cited

U.S. PATENT DOCUMENTS 4,535,682 A * 8/1985 Collyear .................... F16J 1/02
92/158
5,749,331 A 5/1998 Pettersson et al.
(Continued)

FOREIGN PATENT DOCUMENTS

CN 2230820 Y * 7/1996
CN 103946545 A * 7/2014 ............ F04B 35/045
(Continued)

OTHER PUBLICATIONS

International Application No. PCT/AU2022/050671, PCT International Preliminary Report on Patentability, dated May 11, 2023, 5 pages.

(Continued)

*Primary Examiner* — George C Jin
*Assistant Examiner* — Teuta B Holbrook
(74) *Attorney, Agent, or Firm* — Leber IP Law; Celia H. Leber

(57) ABSTRACT

A cylinder liner for providing reduced oil carry-over in an air-assisted fuel injection system comprising an air compression piston wherein the cylinder liner and air compression system together in part define an air compression chamber, the cylinder liner comprising: an outer surface; and a plurality of projections on the outer surface; wherein the plurality of projections are arranged such that oil-laden air drawn up from an oil reservoir around the outer surface of the cylinder liner is forced into a labyrinthine path to increase the time the oil-laden air is in contact with the outer surface and increase the amount of oil adhering to the outer (Continued)

surface to minimize the amount of oil carry-over entering the air compression chamber.

26 Claims, 5 Drawing Sheets

(51) Int. Cl.

| | |
|---|---|
| ***F02M 69/08*** | (2006.01) |
| ***F04B 39/12*** | (2006.01) |
| ***F04B 53/16*** | (2006.01) |

(56) References Cited

U.S. PATENT DOCUMENTS

| | | | | |
|---|---|---|---|---|
| 6,123,052 | A | 9/2000 | Jahn | |
| 11,002,216 | B1 | 5/2021 | Singh et al. | |
| 2006/0067844 | A1 | 3/2006 | Iversen | |
| 2010/0288222 | A1 | 11/2010 | Urabe et al. | |
| 2015/0159581 | A1 | 6/2015 | Maki et al. | |
| 2019/0003415 | A1 | 1/2019 | Becker et al. | |
| 2019/0170055 | A1 * | 6/2019 | Hoffman | F02B 63/02 |
| 2020/0378332 | A1 | 12/2020 | Gaiselmann | |

FOREIGN PATENT DOCUMENTS

| | | | | | |
|---|---|---|---|---|---|
| DE | 102006052427 | A1 | * | 5/2008 | F04B 35/045 |
| DE | 102008021729 | A1 | * | 11/2008 | B01D 45/08 |
| GB | 2565545 | B | | 2/2019 | |
| JP | H06159001 | A | * | 6/1994 | |

OTHER PUBLICATIONS

International Patent Application No. PCT/AU2022/050671, Written Opinion of the International Searching Authority dated Sep. 23, 2022, 5 pages.

International Patent Application No. PCT/AU2022/050671, International Search Report dated Sep. 23, 2022, 5 pages.

* cited by examiner

AIR COMPRESSOR CYLINDER LINER

RELATED APPLICATIONS

This application is a national phase entry of International Patent Application No. PCT/AU2022/050671, filed Jun. 29, 2022, which claims priority from Australian Patent Application No. 2021901987, filed Jun. 30, 2021, the entire disclosures of which are incorporated herein by reference.

FIELD OF THE INVENTION

The present invention relates to a liner for a compression chamber of an air-assisted direct injection combustion engine and in particular to a cylinder liner of an air compressor configured to reduce oil carry-over from the crankcase of the engine to the compression chamber of the air compressor in an air-assisted direct injection combustion engine and will be described hereinafter with reference to this application. However, it will be appreciated that the invention is not limited to this particular field of use.

BACKGROUND

Any discussion of the background art throughout the specification should in no way be considered as an admission that such background art is prior art, nor that such background art is widely known or forms part of the common general knowledge in the field in Australia or worldwide.

All references, including any patents or patent applications, cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications may be referred to herein, such reference does not constitute an admission that any such documents form part of the common general knowledge in the art, in Australia or in any other country.

In an air-assisted (sometimes referred to as a "two-fluid or dual-fluid") direct injection system for a two-stroke engine comprising an integrated compressor, air is drawn in from the engine crankcase by the compressor and made available to the injection system for assisting with the transportation of fuel into the engine cylinder(s) for combustion.

In certain air compressors of this type, air is drawn up from the engine crankcase by the compressor around the outer surface of a compressor cylinder liner and into a compression chamber before being delivered to the two-fluid fuel injection system and subsequently injected into the engine cylinder(s) mixed with fuel for combustion in the engine combustion chamber(s).

Oil carry-over can be a significant issue with such air-assisted fuel injection systems as oil from within a crankcase of an engine employing the injection system, required for lubrication of the engine and/or the air compressor may also be drawn into the compression chamber of the air compressor and subsequently delivered to the engine cylinder(s) by the air-assisted injection system.

Accordingly, there is a need for improved engine components and/or oil reduction mechanisms in such air-assisted engine systems designed to reduce and minimize the amount of oil carry-over into the compression chamber of an air compressor of an air-assisted fuel injection system.

SUMMARY

It is an object of the present invention to overcome or ameliorate at least one or more of the disadvantages of the prior art, or to provide a useful alternative.

According to a first aspect of the invention, there is provided a cylinder liner for providing reduced oil carry-over in an air-assisted fuel injection system comprising an air compression piston wherein the cylinder liner and air compression piston in part define an air compression chamber. The cylinder liner may comprise an outer surface. The cylinder liner may further comprise a high resistance air flow path. The air flow path may be configured along the outside of the cylinder liner. The air flow path may be contiguous with the outer surface of the cylinder liner. The high resistance air flow path may be configured to increase the time that oil-laden air drawn up from an oil reservoir around the outer surface of the cylinder liner and into the air compression chamber is in contact with the outer surface of the liner such that oil is stripped out of the oil-laden air to adhere to the outer surface and minimize the amount of oil carry-over entering the air compression chamber.

According to an arrangement of the first aspect, there is provided a cylinder liner for providing reduced oil carry-over in an air-assisted fuel injection system comprising an air compression piston wherein the cylinder liner and air compression piston in part define an air compression chamber, the cylinder liner comprising: an outer surface; and a high resistance air flow path configured to increase the time that oil-laden air drawn up from an oil reservoir around the outer surface of the cylinder liner and into the air compression chamber is in contact with the outer surface of the liner such that oil is stripped out of the oil-laden air to adhere to the outer surface and minimize the amount of oil carry-over entering the air compression chamber.

According to a second aspect of the invention, there is provided an air compressor cylinder liner for providing reduced oil carry-over in an air-assisted fuel injection system. The injection system may comprise an air compression piston wherein the cylinder liner and air compression piston in part define an air compression chamber. The cylinder liner may comprise an outer surface. The cylinder liner may further comprise a plurality of projections on the outer surface. The plurality of projections may be arranged such that oil-laden air drawn up from an oil reservoir around the outer surface of the cylinder liner is forced into a labyrinthine path to increase the time the oil-laden air is in contact with the outer surface and increase the amount of oil adhering to the outer surface to minimize the amount of oil carry-over entering the air compression chamber.

According to a particular arrangement of the second aspect, there is provided a cylinder liner for providing reduced oil carry-over in an air-assisted fuel injection system, the injection system comprising an air compression piston wherein the cylinder liner and air compression piston in part define an air compression chamber, the cylinder liner comprising:

an outer surface; and a plurality of projections on the outer surface;

wherein the plurality of projections are arranged such that oil-laden air drawn up from an oil reservoir around the outer surface of the cylinder liner is forced into a labyrinthine path to increase the time the oil-laden air is in contact with the outer surface and increase the amount of oil adhering to the outer surface to minimize the amount of oil carry-over entering the air compression chamber.

According to a third aspect of the invention, there is provided a method of reducing oil carry-over in an air-assisted fuel injection system comprising an air compression piston which in part defines an air compression chamber. The method may comprise the step of providing a cylinder liner comprising an outer surface. The method may comprise the step of providing a high resistance air flow path along the outer surface such that, in use, oil-laden air drawn up from an oil reservoir around the outer surface of the cylinder liner and into the air compression chamber may be in contact with the outer surface for an increased time to increase the amount of oil adhering to the outer surface and minimize the amount of oil carry-over entering the air compression chamber. The air flow path may be configured along the outside of the cylinder liner. The air flow path may be contiguous with the outer surface of the cylinder liner According to a particular arrangement of the third aspect, there is provided a method of reducing oil carry-over in an air-assisted fuel injection system comprising an air compression piston which in part defines an air compression chamber, the method comprising the steps of: providing a cylinder liner comprising an outer surface; and providing a high resistance air flow path along the outer surface such that, in use, oil-laden air drawn up from an oil reservoir around the outer surface of the cylinder liner and into the air compression chamber is in contact with the outer surface for an increased time to increase the amount of oil adhering to the outer surface and minimize the amount of oil carry-over entering the air compression chamber.

According to a fourth aspect of the invention, there is provided a method of reducing oil carry-over in an air compressor of an air-assisted fuel injection system, the air compressor comprising an air compression piston which in part defines an air compression chamber. The method may comprise the step of providing an air compressor cylinder liner comprising an outer surface. The method may further comprise the step of providing a plurality of projections on the outer surface. The plurality of projections may be arranged such that, in use, oil-laden air drawn up from an oil reservoir around the outer surface of the cylinder liner is forced into a labyrinthine path around the projections to increase the time the oil-laden air is in contact with the outer surface and increase the amount of oil adhering to the outer surface to minimize the amount of oil carry-over entering the air compression chamber.

According to a particular arrangement of the fourth aspect, there is provided a method of reducing oil carry-over in an air compressor of an air-assisted fuel injection system, the air compressor comprising an air compression piston which in part defines an air compression chamber, the method comprising the steps of:

- providing an air compressor cylinder liner comprising an outer surface; and
- providing a plurality of projections on the outer surface;
  - wherein the plurality of projections are arranged such that, in use, oil-laden air drawn up from an oil reservoir around the outer surface of the cylinder liner is forced into a labyrinthine path around the projections to increase the time the oil-laden air is in contact with the outer surface and increase the amount of oil adhering to the outer surface to minimize the amount of oil carry-over entering the air compression chamber.

The high resistance air flow path of any one of the preceding aspects may be provided by a plurality of projections on the outer surface forming a labyrinth. The projections of any one of the preceding aspects may be configured to force the oil-laden air into a labyrinthine path.

The cylinder liner of any one of the preceding aspects may comprise a plurality of projections extending from the outer surface configured to provide the high resistance air flow path.

The cylinder liner of any one of the preceding aspects may be located in an engine in a vertical orientation. Oil stripped out of the oil-laden air of any one of the preceding aspects may flow back down the outer surface of the cylinder liner and into the oil reservoir.

The oil reservoir may be provided by a crankcase of the engine.

In use, the projections of any one of the preceding aspects may be vertically misaligned.

The plurality of projections of any one of the preceding aspects may be radially extending from the outer surface.

The projections of any one of the preceding aspects may be generally polygonal in shape.

The generally polygonal projections of any one of the preceding aspects may be arranged in a plurality of circumferential rings about the outer surface of the cylinder liner.

The projections of a first circumferential ring of any one of the preceding aspects may be misaligned vertically with respect to projections of a further adjacent circumferential ring.

The projections of any one of the preceding aspects may be pillars radially extending from the outer surface.

The projections of any one of the preceding aspects may be randomly distributed over the outer surface.

The engine of any one of the preceding aspects may be a two-stroke engine.

The cylinder liner of any one of the preceding aspects may be located in the engine in a vertical orientation such that oil stripped out of the oil-laden air flows back down the outer surface of the cylinder liner and into a crankcase of the engine.

The high resistance air flow path of any one of the preceding aspects may comprise an air path for the air over the outer surface which has a high surface area which is conducive to removing oil from the oil-laden air. The air flow path may be configured along the outside of the cylinder liner. The air flow path may be contiguous with the outer surface of the cylinder liner.

The high resistance air flow path of any one of the preceding aspects may comprise a tortuous air flow path.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which like numerals are used to describe like components, wherein.

DEFINITIONS

Figure 1:
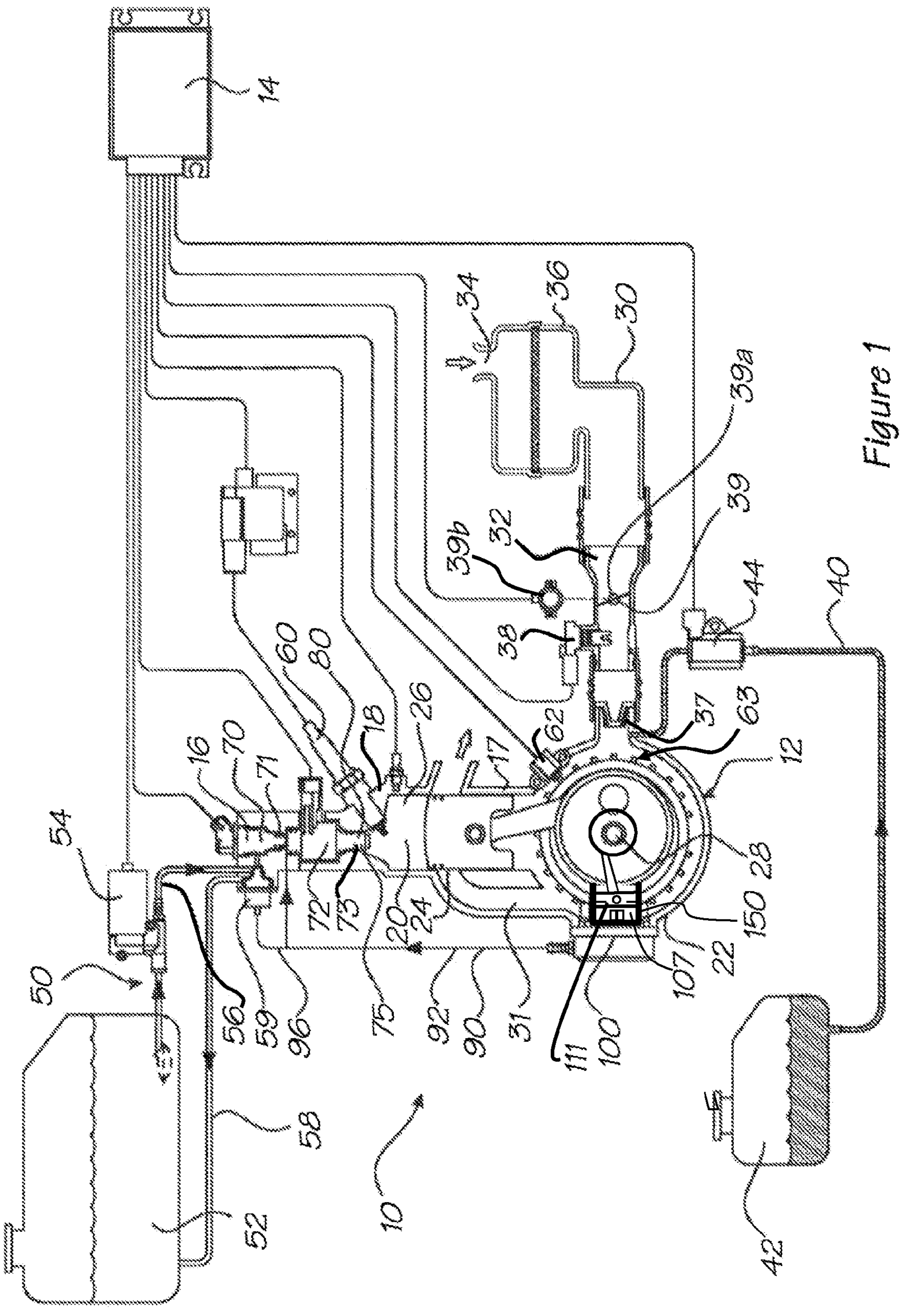
FIG. 1 shows a schematic arrangement of an internal combustion engine system comprising a dual-fluid direct injection system.

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word "about" to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

As described herein, "in accordance with" may also mean "as a function of" and is not necessarily limited to the integers specified in relation thereto.

Although any methods and materials similar or equivalent to those described herein can be used in the practice or testing of the present invention, preferred methods and materials are described. It will be appreciated that the methods, apparatus, and systems described herein may be implemented in a variety of ways and for a variety of purposes. The description here is by way of example only.

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one", in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one. A, and at least one, optionally including more than one, B (and optionally including other elements); etc.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

DETAILED DESCRIPTION

It should be noted in the following description that like or the same reference numerals in different embodiments denote the same or similar features.

In the following detailed description, the present invention is described in connection with a preferred embodiment. However, to the extent that the following description is specific to a particular embodiment or a particular use of the present techniques, it is intended to be illustrative only and merely provides a concise description of the exemplary embodiment. Accordingly, the present invention is not limited to the specific embodiment described below, but rather the invention includes all alternatives, modifications, and equivalents falling within the true scope of the appended claims.

The cylinder liner of the present disclosure will be described with reference to an air-assisted direct injection internal combustion engine system 10 as shown schematically in a single-cylinder arrangement in FIG. 1. However, it will be readily appreciated by the skilled addressee that the principles described herein are applicable to multi-cylinder engines mutatis mutandis. The engine system 10 comprises a small, single-cylinder reciprocating piston two-stroke engine 12 operating under the control of an electronic control unit (ECU) 14. The engine 12 may be fueled with any appropriate fuel, including gasoline and heavy fuels (e.g. military fuels such as JP-5 and JP-8) and may be arranged to power an unmanned aerial vehicle (UAV).

The engine system 10 further comprises a dual-fluid direct injection system 16 facilitating a gas-assist fuel delivery process. In the embodiment to be described, the gas comprises air thereby providing an air-assist fuel delivery process wherein fuel entrained in the air is delivered directly into a combustion chamber of the engine 12.

The engine 12 comprises an engine block 17 and a cylinder head 18 which together define a cylinder 20 and a crankcase 22. A combustion piston 24 is accommodated in the cylinder 20. The cylinder 20 and the combustion piston 24 cooperate to define the combustion chamber 26.

The combustion piston 24 is connected to a crankshaft 28 rotatably supported within the crankcase 22 in known manner.

An air intake system 30 is provided to deliver combustion air into the crankcase 22 for delivery into the combustion chamber 26 by crankcase compression via transfer port 31. The air intake system 30 includes an air intake path 32 extending between an intake end 34 incorporating an air filter 36, and an outlet end 37 opening into the crankcase 22. The air intake path 32 has an air flow sensor 38 providing signals to the ECU 14 indicative of air flow. The air intake path 32 also has an air flow control valve 39 operable under the control of the ECU 14. The air flow control valve 39 comprises a throttle having a throttle valve 39*a*, with the angular position of the throttle valve 39*a* regulating air flow by varying the extent of restriction to the air flow presented by the throttle valve 39*a*. The throttle valve 39*a* is selectively movable between a fully closed condition (fully restricting or at least minimising fluid flow) and a fully open condition (allowing maximum fluid flow). The throttle valve 39*a* is selectively movable into any angular position between the fully open and fully closed conditions by a throttle position controller (not shown) which may comprise a servo motor (not shown) operating under the control of an electronic throttle control module 39*b* in communication with or integrated into the ECU 14.

It should, however, be noted that in other arrangements the air intake path 32 may not necessarily include an air flow sensor, and that the inclusion of the air flow sensor 38 in the current embodiment in no way limits the scope of the present invention. For example, in an alternative arrangement, the air flow sensor 38 could be replaced with a combined temperature and absolute pressure sensor (or a T-MAP sensor), the signals of which are used within the ECU 14 to provide inputs to a calculation to determine air flow.

A lubrication system 40 is provided to deliver lubricating oil into the air intake path 32 for entrainment in intake air flow into the crankcase 22. The lubrication system 40 includes an oil reservoir 42 and an oil pump 44 which is operable under the control of the ECU 14. In the present arrangement shown in FIG. 1, the lubricating oil is admitted into the air intake path 32 after outlet 37 of the air intake system 30 for subsequent delivery into the crankcase 22. In further embodiments, the lubricating oil from reservoir 42 may be admitted into the air intake path 32 and/or crankcase 22 at different locations as would be appreciated by the skilled addressee. For example, in particular arrangements the lubricating oil may be admitted prior to air outlet 37 for subsequent delivery into the crankcase 22 or in alternate locations as would be readily appreciated by the skilled addressee.

A fuel supply system 50 is provided to deliver fuel to the dual-fluid direct injection system 16. The fuel supply system 50 includes a fuel reservoir 52 and an electrical fuel pump 54 which is operable under the control of the ECU 14. The fuel supply system 50 further includes a fuel supply line 56 adapted to receive fuel from the fuel reservoir 52 and to deliver it to the dual-fluid direct injection system 16, and a fuel return line 58 to return excess liquid fuel to the fuel reservoir 52 in known manner. The fuel pump 54 is associated with the fuel supply line 56. The fuel supply system 50 also includes a fuel pressure regulator 59 for regulating the fuel pressure against air pressure in the dual-fluid direct injection system 16, as would be understood by a person skilled in the art.

An ignition system 60 is provided for igniting a combustible mixture within the combustion chamber 26. The ignition system 60 is also operable under the control of the ECU 14.

A sensor 62 is operably arranged with respect to an encoder wheel 63 arranged on the crankshaft 28 to provide signals to the ECU 14 indicative of the speed and rotational position of the crankshaft 28.

The dual-fluid direct injection system 16 facilitating the air-assist fuel delivery process comprises a fuel metering device 70 and a fluid delivery device 72 operating in tandem. Fuel metered from the fuel metering device 70 is delivered into a mixing zone 75 for mixing with air received from a pressurised supply to provide an air-fuel mixture for injection by the fluid delivery device 72 into the combustion chamber 26. In the arrangement shown, the fuel metering device 70 comprises a fuel injector 71, and the fluid delivery device 72 comprises a fluid delivery injector 73. The pressure of fuel supplied to the fuel metering device 70 is controlled by the fuel pressure regulator 59.

The fuel metering device 70 and the fluid delivery device 72 are each operable in response to control signals received from the ECU 14. The operation of each device 70, 72 is controlled in terms of the timing of opening and the duration of opening thereof in a regime determined by the ECU 14.

A gas supply system 90 is provided to supply pressurised air to the dual-fluid direct injection system 16. More particularly, the gas supply system 90 is operable to supply air under pressure to the fluid delivery device 72, where on opening of the fluid delivery device 72 pressurised air can flow through the fluid delivery device 72 and be delivered into the combustion chamber 26. The pressurised air communicates with the mixing zone 75, and when the fluid delivery device 72 is opened, any fuel metered into the mixing zone 75 by the fuel metering device 70 is entrained by the pressurised air and delivered through a valve port 80 into the combustion chamber 26.

The gas supply system 90 comprises an air flow line 92 extending between an air compressor 100 and the fluid delivery device 72. The air compressor 100 is driven mechanically by the engine 12 and as such operates independently of the ECU 14; that is, the air compressor 100 is not directly controlled by the ECU 14. In the arrangement shown, the air compressor 100 receives intake air from the air intake system 30 via the crankcase 22; that is, the intake of the air compressor 100 is in communication with the crankcase 22 to receive intake air for compression. Air compressor 100 comprises an air compression piston 111, and a cylinder liner 150 configured such that air compression piston 111 together with cylinder liner 150 in part define an air compression chamber 107.

The fuel pressure regulator 59 is in communication with the gas supply system 90. More particularly, the fuel pressure regulator 59 is in communication with air flow line 92 via branch line 96.

The ECU 14 is configured to be responsive to information received by various sensors by controlling and/or adjusting one or more operating parameters of the engine system 10. The ECU 14 includes a timing means (not shown) such as a counter operable to delay initiation of certain of the operating parameters of the engine system 10 for a prescribed time duration.

The engine system 10 shown is adapted to be cranked for start-up by an external torque drive releasably coupled to the engine crankshaft 28. Further, electrical energy for operating various engine components and systems (such as the ECU 14, the electrical fuel pump 54, the ignition system 60, the fuel metering device 70, and the fluid delivery device 72) is generated by a generator (not shown) mechanically coupled to the engine 12 and operable upon cranking and subsequent running of the engine 12. The engine 12 may however be configured to include a battery and starter-motor system and the exclusion of these elements in the current embodiment in no way limits the scope of the present disclosure.

Figure 2:
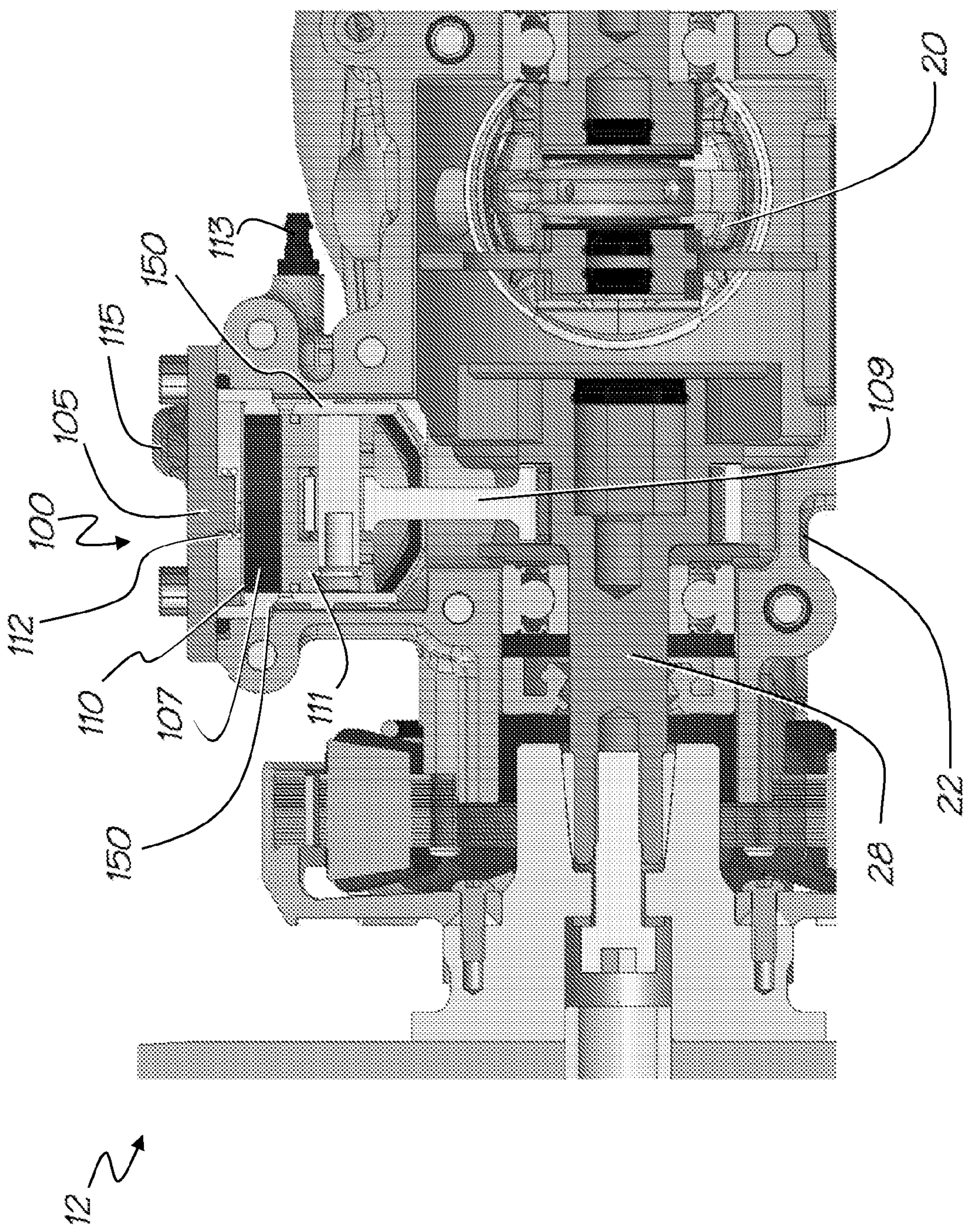
FIG. 2 shows a cross-sectional view of a crankcase portion of an air-assisted direct injection combustion engine.

FIG. 2 shows a cross-sectional view of a portion of the air-assisted fuel injection engine 12 shown in FIG. 1, including air compressor 100 for drawing air from the crankcase 22 and making that air available to the injection system (as shown in FIG. 1) for transporting fuel into the engine cylinder 20 for combustion and driving of the crankshaft 28. Air compressor 100 includes a compressor cap 105, pumping/compression chamber 107, air compressor piston rod 109 for driving a compressor piston 111, compressor disk valve 110, and air outlet passage(s) 115 arranged in the compressor cap 105. The disk valve 110 is arranged to be seated in a known manner to isolate the compression chamber 107 from the air outlet passage(s) 115, and able to be lifted or unseated against the action of a spring 112 in response to a rise in the pressure within the compression chamber 107 to thereby allow for fluid communication between the compression chamber 107 and the air outlet passage(s) 115. An air pressure outlet 113 is also provided for feeding compressed air to the oil reservoir 42 of the engine system 10 for pressurisation of same.

Figure 2B:
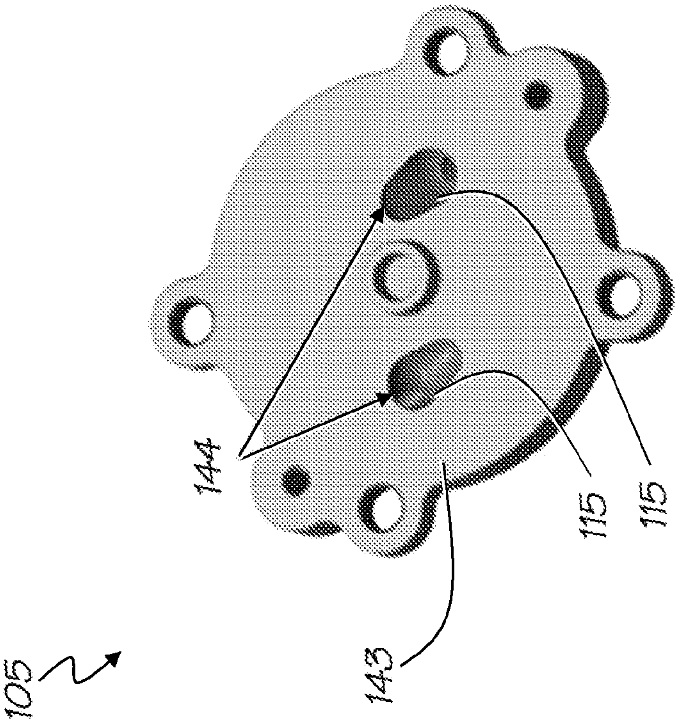
FIG. 2B shows a further example embodiment of a compressor cap for an air compressor cylinder of an air-assisted direct injection combustion engine.
Figure 2A:
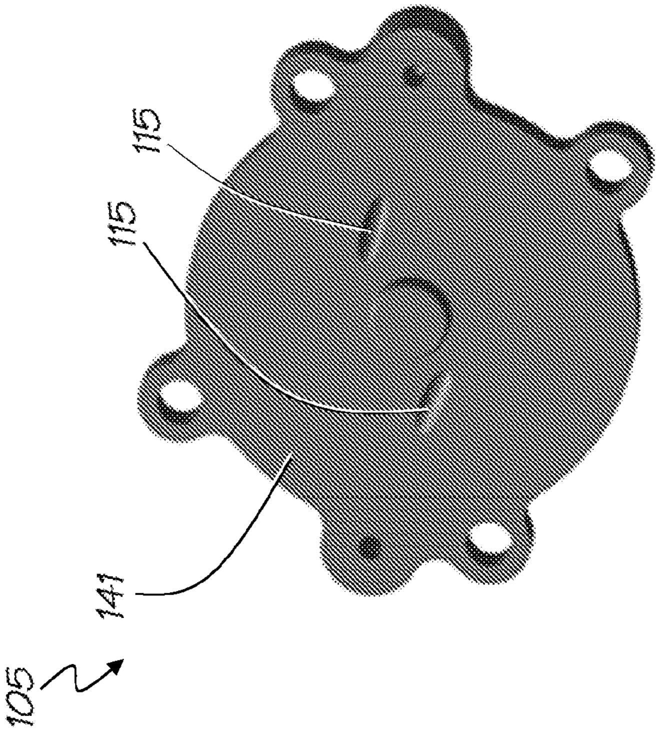
FIG. 2A shows an example embodiment of a compressor cap for an air compressor cylinder of an air-assisted direct injection combustion engine.

An embodiment 141 of compressor cap 105 is shown in FIG. 2A. One or more air outlet passages 115 in this embodiment have a small, sharp-edged opening at the point(s) at which the air outlet passage(s) 115 (two shown in the present embodiment) open into the volume above the disk valve 110) which is communicated with the compression chamber 107 when the disk valve 110 is unseated against the action of the spring 112.

A further embodiment 143 of compressor cap 105 is shown in FIG. 2B. In this embodiment, the one or more air outlet passages 115 (two shown in the embodiment) comprise a scalloping (or tear drop profile) feature 144 at the point(s) at which the air outlet passage(s) 115 open into the volume above the disk valve 110 to provide a wider entrance profile to the outlet passage(s) 115. The additional benefit of the wider entry features 144 which narrow to a smaller cross-sectional area of the outlet passage(s) 115 is the provision of a larger surface area which interacts with the air flow from the compression chamber 107 when the disk valve 110 is unseated to provide additional stripping of oil from the air flow as it enters the air outlet passage(s) 115. The oil which collects on the additional surface area around the entry features to the outlet passage(s) 115 typically finds its way back into the crankcase 22 either via the inlet ports 117 (as best seen in FIGS. 3A and 3B) or past a piston ring 114 of the compressor piston 111 during the cyclic operation of the compressor 100.

Figure 3B:
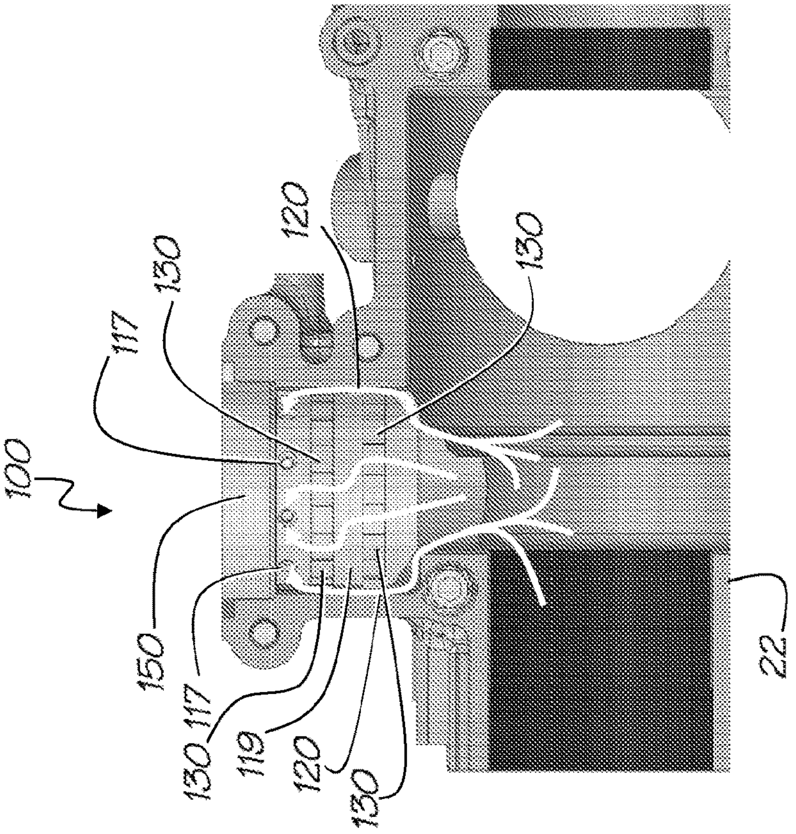
FIG. 3B shows a partial cross-sectional detailed view of an air compressor cylinder of the combustion engine of FIG. 2, wherein a compressor cylinder liner is shown in side relief view.
Figure 3A:
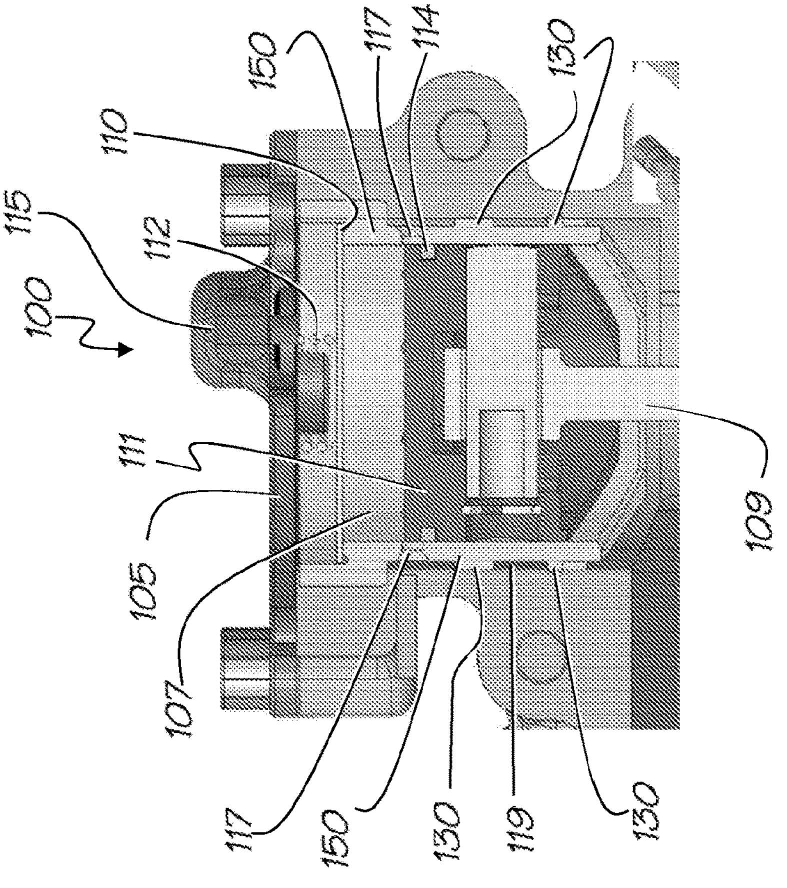
FIG. 3A shows a cross-sectional detailed view of an air compressor cylinder integrated with the combustion engine of FIG. 2.
Figure 5:
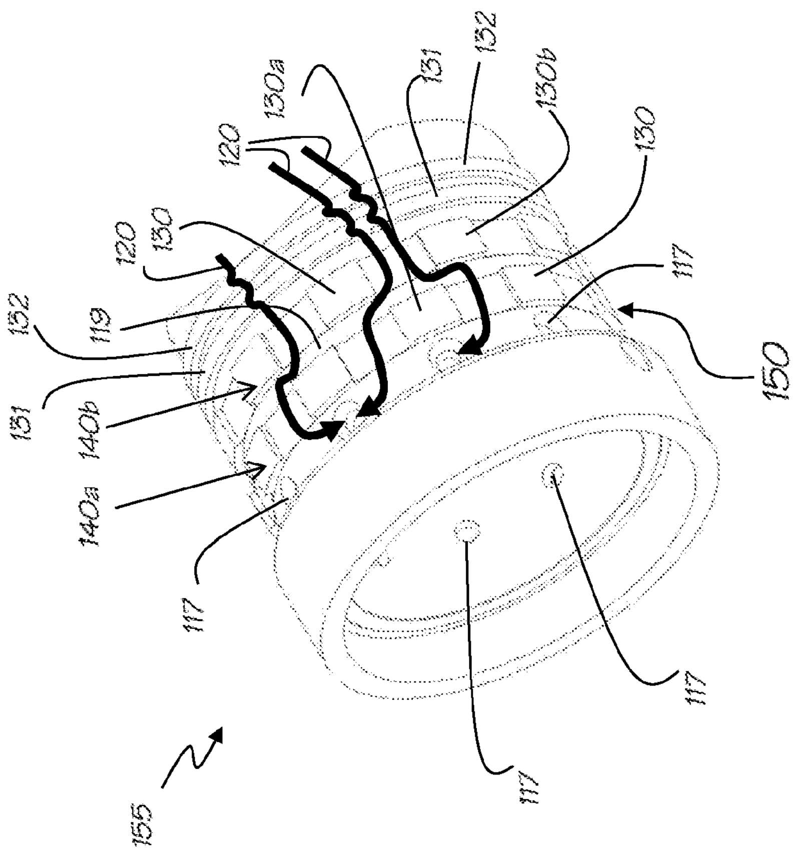
FIG. 5 shows a perspective view of an alternative embodiment of the compressor cylinder liner for reduced oil carry-over in the combustion engine of FIG. 2.
Figure 4:
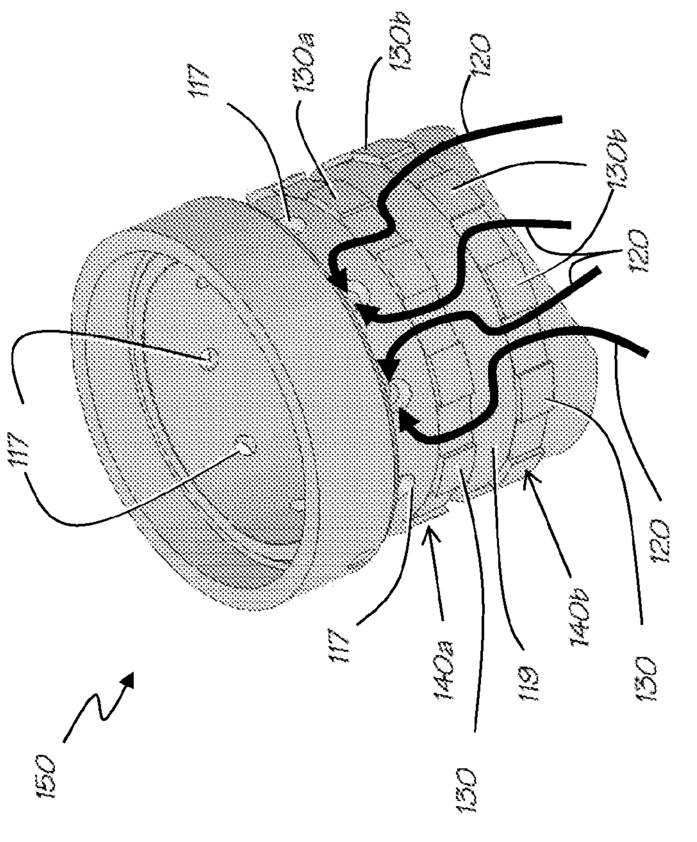
FIG. 4 shows a perspective view of the compressor cylinder liner for reduced oil carry-over in the combustion engine of FIG. 2.

Compressor 100 also includes compressor liner 150 shown in greater detail in FIGS. 3A and 3B and in isolation in the embodiments shown in FIGS. 4 and 5. Together, air compressor cylinder liner 150 and air compressor piston 111 in part define the compression chamber 107. Compressor piston 111 reciprocates within cylinder liner 150 to compress air 120 drawn up from the crankcase 22 along the outer surface 119 of liner 150 which is admitted into compression chamber 107 via inlet ports 117 located circumferentially around an upper portion the cylinder liner 150. An upper extent of the cylinder liner 150 also serves to define the seat for the disk valve 110. As alluded to above, the disk valve 110 is lifted or unseated from this seat against the action of the spring 112 in response to a rise in the pressure within the compression chamber 107 to thereby allow for fluid communication between the compression chamber 107 and the air outlet passage(s) e.

As a consequence of lubricating oil being delivered into the crankcase 22 by way of the oil pump 44, the air resident within the crankcase 22 and drawn therefrom is typically laden with oil. That is, the mechanical operation/movement of the crankshaft 28 and other engine components within the crankcase 22, together with air movement dynamics within the crankcase 22, result in some of the oil resident within the crankcase 22 mixing with the air to create an oil mist within the crankcase 22 (i.e. oil-laden air). As the oil-laden air 120 is drawn up the outer surface 119 of the cylinder liner 150, some of the oil in the air 120 which contacts the liner 150 adheres to the outer surface 119 of liner 150 and flows back down the outer surface 119 dropping back into the crankcase 22 by virtue of gravity. In prior cylinder liner designs, this oil-stripping effect is minimal or not present resulting in significant amounts of oil often being carried into the compression chamber 107 and delivered therefrom. The delivery of this oil-laden air by the air compressor 100 to the injection system 16 can be very detrimental to performance of the injection system 16 and resulting engine performance.

FIG. 4 shows a perspective view of cylinder liner 150 in accordance with an example arrangement of the present invention in isolation from engine 12. Cylinder liner 150 comprises a plurality of castellations or projections 130 arranged on the outer surface 119 which extend radially outward from the outer surface 119 of liner 150. In the particular example arrangement depicted in FIG. 4, projections 130 are arranged on outer surface 119 in at least two circumferential rings of castellations, that is, rings 140*a* and 140*b*. A plurality of projections 130*a* of a first ring 140*a* are configured to be in opposition to a plurality of projections 130*b* of a second ring 140*b* of castellations. That is, projections 130*a* of a first ring 140*a* are misaligned vertically with respect to projections 130*b* of a further adjacent circumferential ring 140*b* such that a projection 130*a* of ring 140*a* is located adjacent to the space between two adjacent projections 130*b* of ring 140*b*.

FIG. 5 shows a perspective view of a further embodiment 155 of a cylinder liner 150 in accordance with an example arrangement of the present invention in isolation from engine 12. As above for previous cylinder liner embodiment 150, cylinder liner embodiment 155 comprises a plurality of castellations or projections 130 arranged on the outer surface 119 which extend radially outward from the outer surface 119 of liner 155. In the example arrangement depicted in FIG. 5, projections 130 are arranged on outer surface 119 in at least two circumferential rings 140*a* and 140*b*. Projections 130*a* of a first ring 140*a* are configured to be in opposition to projections 130*b* of a second ring 140*b*. That is, projections 130*a* of a first ring 140*a* are misaligned vertically with respect to projections 130*b* of a further adjacent circumferential ring 140*b* such that a projection 130*a* of ring 140*a* is located adjacent to the space between two adjacent projections 130*b* of ring 140*b*. Liner embodiment 155 further comprises additional parallel circumferential ridges 131 and 132 around the outer surface of liner 155. Additional parallel ridges 131 and 132 together act as a primary labyrinth to further disturb the flow of air 120 along the outside of the liner 155. This primary labyrinth arrangement provides the additional benefit that the paths of air 120 flowing over the outside of the liner 155 are further contorted with respect to the flow paths of air 120 in embodiment 150 of FIG. 4. The parallel ridges 131 and 132 together act to provide a first resistance action to the oil ladened air 120 flowing past the ridges to physically scour the oil from the air 120 and collect the oil such that it flows back down into the crankcase 22 of engine 12. The circumferential rings 140*b* and 140*a* then effectively serve as secondary and third resistance elements in this embodiment to scour and collect oil from the oil ladened air as it flows over the outer surface 119.

The two parallel ridges 131 and 132, together forming the primary labyrinth, are sized to still allow air 120 to pass along the outside of the liner 150/155 and up to the air inlet ports 117 for entry into the compression chamber 107, but otherwise are just protrusions on the outside of the liner located at a lower portion of the liner itself (i.e. closer to the crankcase 22 when arranged on the engine 12) than the castellation rings 140*a* and 140*b*. The primary labyrinth is arranged in the air flow path to physically scour and collect oil as the oil ladened air flows past these features. The outer diameter of the parallel ridges 131 and 132 forming the primary labyrinth is similar to that of the pluralities of castellations 130*a* and 130*b*. The castellations have a clearance from their outer diameter to the crankcase housing to minimize the chance of them contacting the crankcase housing bore during operation as this may result in fretting. Effectively, the primary labyrinth is just another passive barrier which the air can impact as it flows up and along the cylinder liner 150/155, causing any oil to attach to the parallel ridges 131 and 132 as it does so, with the scoured oil at some point, falling back down into the crankcase 22 of engine 12.

In preferred embodiments, cylinder liner 150/155 is sized such that the outer surface extent of projections 130*a* and 130*b* form a controlled fit with the inner surface of part of the crankcase 22 housing. In this arrangement, air 120 which is drawn up from the crankcase 22 between the outer surface 119 of liner 150/155 and the inner surface of the crankcase housing is forced to propagate around projections 130*a* and 130*b* of circumferential rings 140*a* and 140*b* before entering the compression chamber 107 through the inlet ports 117. In this manner, air drawn into the compression chamber 107 is forced into a labyrinthine path between the crankcase 22 and the compression chamber 107. Projections 130 are advantageously located so as to form a labyrinth for oil-laden air 120 flowing from the crankcase 22 into the cylinder liner 150/155. The projections 130 (together with the primary labyrinth in liner 155) provide a high-resistance air path for air 120 drawn up from crankcase 22 since the labyrinthine path forces the air to travel slower, change direction and or to have a greater contact time with outer surfaces (i.e. outer surface 119 of liner 150/155 and the edge surfaces of projections 130*a* and 130*b*. In this way, oil is essentially stripped from the air 120 as it drawn into the compression chamber 107 through contact with outer surface 119 and projections 130 of the cylinder liner 150/155, thus significantly reducing the oil carry-over into the compression chamber 107. That is, the arrangement of projections 130 on the outer surface 119 provides an air path for the air 120 which has a high surface area which is conducive to removing oil from the oil-laden air. The path that the drawn air 120 is required to traverse, is also tortuous as a consequence of the arrangement of the projections 130 on the outer surface, this also facilitating the removal of oil from the oil-laden air.

In terms of the location of the inlet ports 117, rather than being located adjacent to the space between two adjacent projections 130, inlet ports 117 are optimally located adjacent to a projection 130 as depicted in FIG. 4. This ensures that the oil-laden air 120 must travel around the final projection 130 prior to entering the compression chamber 107, thus increasing the residence time of air 120 in contact with outer surface 119 of the liner 150/155. The clearance between the outside diameter of projections 130 and the liner 150/155 housing is also minimized to ensure the depth of the flow path for the air 120 is small and of high resistance as a consequence.

The projections 130 making up the labyrinth on outer surface 119 of liner 150/155 are designed to effectively direct the airflow 120 around the projections 130. In this manner, air 120 is slowed due to contact with the projections 130 enabling the oil entrained in the air 120 to contact the cylinder liner outer surfaces and collect on the projections 130. Air 120 continues to flow toward the cylinder liner inlet ports 117 as oil is stripped from the air 120 prior to entry into the compression chamber 107.

As alluded to above, the vertical alignment of the air compressor cylinder liner 150/155 encourages oil stripped from air 120 to flow back down outer surface 119 of liner

150/155 and back down into crankcase 22 of engine 12. This provides the additional advantage that oil which is stripped from the air 120 is returned to the crankcase 22 and onto key engine components arranged therein to provide lubrication for such components of the engine 12 (e.g. such as the crankshaft 28 and engine bearings (not shown)).

A further advantage of the air compressor cylinder liner 150/155 described herein ensues when a crankcase pressurisation system as described in U.S. Ser. No. 10/184,367B2 (the contents of which are incorporated in their entirety herein by cross-reference) is also employed in the engine system 10, in that the cylinder liner 150/155 ensures that less oil is drawn into said crankcase pressurisation system. That is, the oil flowing into the oil pressurisation system of the engine system 10 (i.e. via the air pressure outlet 113) is also minimized as a consequence of the action of the labyrinth formed by projections 130. The air pressure outlet 113 can also advantageously be located adjacent the upper circumferential ring 140*a* so as to ensure that air which is drawn off through the outlet 113 and delivered to the oil pressurisation system has had to flow along the labyrinthine path and consequentially had oil stripped therefrom before passing through the outlet 113.

In alternate arrangements, liner 150/155 according to the present invention may comprise more than two circumferential rings 140 of projections or castellations 130. Alternatively, liner 150/155 may comprise a plurality of projections 130 randomly distributed over the outer surface 119 of liner 150/155. Projections 130 may take any preferred shape, for example, generally regular polygonal shaped projections 130*a* and 130*b* as seen, for example in FIG. 4. In alternative arrangements, projections 130 may take the form of, for example, irregular polygonal shapes arranged as part of a randomly distributed forest of pillars over outer surface 119.

In preferred arrangements, projections are located relative to each other such that there are generally no straight pathways for air 120 to travel along the outside of liner 119 and into the compression chamber 107. In general terms, projections 130 act to increase the path length for drawn up air 120 to thereby increase the contact time of the air 120 with outer surface 119 of liner 150/155 and also to increase the contact time of the air 120 with the plurality of projections 130, thereby increasing the amount of oil which adheres to the liner 150/155 and subsequently returns to the crankcase 22 under the effect of gravity.

It will be readily appreciated by the skilled addressee that the air compressor cylinder liner 150/155 described herein is equally applicable to single-cylinder engines as to multi-cylinder engines mutatis mutandis, whether a respective plurality of compressors (and hence cylinder liners 150/155) are used in association with each engine cylinder of the multi-cylinder engine respectively, or whether a single air compressor (and hence cylinder liner 150/155) is provided to supply air for the injection of fuel to each of the multiple engine cylinders.

EMBODIMENTS

Reference throughout this specification to “one embodiment”, “an embodiment”, “one arrangement” or “an arrangement” means that a particular feature, structure, or characteristic described in connection with the embodiment/arrangement is included in at least one embodiment/arrangement of the present invention. Thus, appearances of the phrases “in one embodiment/arrangement” or “in an embodiment/arrangement” in various places throughout this specification are not necessarily all referring to the same embodiment/arrangement, but may. Furthermore, the particular features, structures or characteristics may be combined in any suitable manner, as would be apparent to one of ordinary skill in the art from this disclosure, in one or more embodiments/arrangements.

Similarly, it should be appreciated that in the above description of example embodiments/arrangements of the invention, various features of the invention are sometimes grouped together in a single embodiment/arrangement, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment/arrangement. Thus, the claims following the Detailed Description are hereby expressly incorporated into this Detailed Description, with each claim standing on its own as a separate embodiment/arrangement of this invention.

Furthermore, while some embodiments/arrangements described herein include some but not other features included in other embodiments/arrangements, combinations of features of different embodiments/arrangements are meant to be within the scope of the invention, and form different embodiments/arrangements, as would be understood by those in the art. For example, in the following claims, any of the claimed embodiments/arrangements can be used in any combination.

Specific Details

In the description provided herein, numerous specific details are set forth. However, it is understood that embodiments of the invention may be practiced without these specific details. In other instances, well-known methods, structures, and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as “forward”, “rearward”, “radially”. “peripherally”, “upwardly”, “downwardly”, and the like are used as words of convenience to provide reference points and are not to be construed as limiting terms.

Different Instances of Objects

As used herein, unless otherwise specified the use of the ordinal adjectives “first”, “second”, “third”, etc., to describe a common object, merely indicate that different instances of like objects are being referred to, and are not intended to imply that the objects so described must be in a given sequence, either temporally, spatially, in ranking, or in any other manner.

Scope of Invention

Thus, while there has been described what are believed to be the preferred arrangements of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It will be appreciated that the methods/apparatus/devices/systems described/illustrated above at least substantially provide a cylinder liner with labyrinthine path for reduced oil carry-over in an air assisted fuel injection system.

The cylinder liner described herein, and/or shown in the drawings, are presented by way of example only and are not limiting as to the scope of the invention. Unless otherwise specifically stated, individual aspects and components of the disclosed cylinder liner may be modified, or may have been substituted for known equivalents, or as yet unknown substitutes such as may be developed in the future, or such as may be found to be acceptable substitutes in the future. The cylinder liner may also be modified for a variety of applications while remaining within the scope and spirit of the claimed invention, since the range of potential applications is great, and since it is intended that the present cylinder liner be adaptable to many such variations.

The claims defining the invention are as follows:

1. A cylinder liner for providing reduced oil carry-over in an air-assisted fuel injection system comprising an air compression piston, wherein the cylinder liner and the air compression piston together in part define an air compression chamber, the cylinder liner comprising:

an outer surface; and a high resistance air flow path configured to increase the time that oil-laden air drawn up from an oil reservoir around the outer surface of the cylinder liner and into the air compression chamber is in contact with the outer surface of the liner such that oil is stripped out of the oil-laden air to adhere to the outer surface and minimize the amount of oil carry-over entering the air compression chamber.

2. A cylinder liner as claimed in claim 1 comprising a plurality of projections extending from the outer surface configured to provide the high resistance air flow path.

3. A cylinder liner as claimed in claim 2 wherein the projections are configured to force the oil-laden air into a labyrinthine path.

4. A cylinder liner as claimed in claim 3 wherein, when in use, the projections are vertically misaligned.

5. A cylinder liner as claimed in claim 4 wherein the projections are generally polygonal in shape.

6. A cylinder liner as claimed in claim 5 wherein the generally polygonal projections are arranged in a plurality of circumferential rings about the outer surface of the liner.

7. A cylinder liner as claimed in claim 6 wherein the projections of a first circumferential ring are misaligned vertically with respect to projections of a further adjacent circumferential ring.

8. A cylinder liner as claimed in claim 2 wherein the projections comprise elongate pillars radially extending from the outer surface.

9. A cylinder liner as claimed in claim 1 wherein the cylinder liner is configured to be used in an air compressor integrated with an engine.

10. A cylinder liner as claimed in claim 9 wherein the engine is a two-stroke engine.

11. A cylinder liner as claimed in claim 9 wherein the cylinder liner is located in the engine in a vertical orientation such that oil stripped out of the oil-laden air flows back down the outer surface of the cylinder liner and into a crankcase of the engine.

12. A cylinder liner as claimed in claim 1 wherein the high resistance air flow path comprises an air path for the air over the outer surface which has a high surface area which is conducive to removing oil from the oil-laden air.

13. A cylinder liner as claimed in claim 1 wherein the high resistance air flow path comprises a tortuous air flow path.

14. A method of reducing oil carry-over in an air-assisted fuel injection system comprising an air compression piston which in part defines an air compression chamber, the method comprising the steps of:

providing a cylinder liner comprising an outer surface; and providing a high resistance airflow path along the outer surface such that, in use, oil-laden air drawn up from an oil reservoir around the outer surface of the cylinder liner and into the air compression chamber is in contact with the outer surface for an increased time to increase the amount of oil adhering to the outer surface and minimize the amount of oil carry-over entering the air compression chamber.

15. A method as claimed in claim 14 wherein the high resistance air flow path is provided by a plurality of projections on the outer surface forming a labyrinth such that oil-laden air is forced into a labyrinthine path around the projections.

16. A method as claimed in claim 15 wherein, when in use, the projections are vertically misaligned.

17. A method as claimed in claim 15 wherein the plurality of projections are radially extending from the outer surface.

18. A method as claimed in claim 15 wherein the projections are generally polygonal in shape.

19. A method as claimed in claim 18 wherein the generally polygonal projections are arranged in a plurality of circumferential rings about the outer surface of the liner.

20. A method as claimed in claim 19 wherein the projections of a first circumferential ring are misaligned vertically with respect to projections of a further adjacent circumferential ring.

21. A method as claimed in claim 18 wherein the projections are pillars radially extending from the outer surface.

22. A method as claimed in claim 14 wherein the cylinder liner is configured to be used in an air compressor integrated with an engine.

23. A method as claimed in claim 22 wherein the engine is a two-stroke engine.

24. A method as claimed in claim 14 wherein the high resistance air flow path comprises an air path for the air over the outer surface which has a high surface area which is conducive to removing oil from the oil-laden air.

25. A method as claimed in claim 14 wherein the high resistance air flow path comprises a tortuous air flow path.

26. A method as claimed in claim 14 further comprising: providing a compressor cap adapted to engage and seal the compressor liner, the cap comprising one or more air outlet ports, each outlet port comprising a wide opening which narrows to form an air outlet passage opening into the compression chamber.

* * * * *